US009274637B2

(12) United States Patent
Timpone et al.

(10) Patent No.: US 9,274,637 B2
(45) Date of Patent: Mar. 1, 2016

(54) ELECTRONIC BROADCAST LOG SYSTEM

(71) Applicant: Disney Enterprises, Inc., Burbank, CA (US)

(72) Inventors: Robert Timpone, Clearwater, FL (US); Glenn Godfrey, Montville, NJ (US); Jerry Rapella, Belford, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 125 days.

(21) Appl. No.: 14/250,248

(22) Filed: Apr. 10, 2014

(65) Prior Publication Data

US 2015/0293635 A1    Oct. 15, 2015

(51) Int. Cl.
*G06F 3/041* (2006.01)
*G06F 3/0484* (2013.01)
*G06F 3/01* (2006.01)
*G09G 3/36* (2006.01)

(52) U.S. Cl.
CPC .............. *G06F 3/0412* (2013.01); *G06F 3/017* (2013.01); *G06F 3/04842* (2013.01); *G09G 3/36* (2013.01); *G06F 2203/04101* (2013.01); *G06F 2203/04808* (2013.01)

(58) Field of Classification Search
CPC ................................................ G06F 17/30772
See application file for complete search history.

(56) References Cited

U.S. PATENT DOCUMENTS

2007/0088804 A1*  4/2007  Qureshey .......... G06F 17/30749
                                                        709/217
2011/0039506 A1*  2/2011  Lindahl .................... G10L 19/20
                                                        455/130

* cited by examiner

*Primary Examiner* — Gerald Johnson
(74) *Attorney, Agent, or Firm* — Farjami & Farjami LLP

(57) ABSTRACT

There is provided a system and method for displaying a traffic output synchronized with an automation output, the system including a display, a memory storing a user interface, and a processor configured to receive the traffic output, receive the automation output, synchronize the traffic output with the automation output, and display the traffic output synchronized with the automation output using the user interface on the display. The processor is further configured to advance each of the traffic output and the automation output being displayed by the user interface in real-time. Furthermore, the processor is further configured to update the traffic output being displayed by the user interface based on feedback from the automation output. The updating including marking each element in the traffic output as being aired correctly or not being aired correctly.

20 Claims, 3 Drawing Sheets

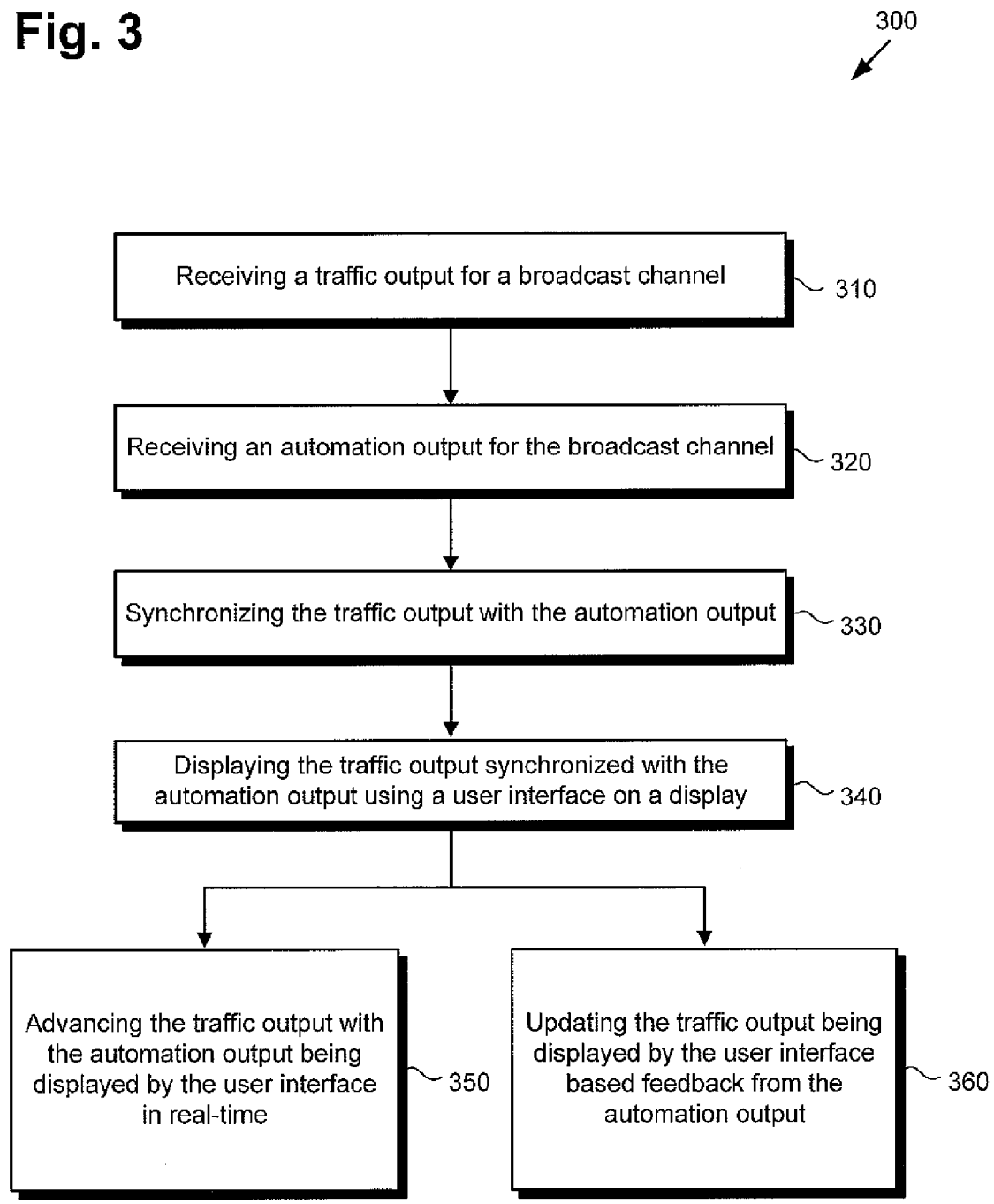

ELECTRONIC BROADCAST LOG SYSTEM

BACKGROUND

A typical Broadcast Operations Center relies on several sources of information to provide an overview of activities related to content distribution, routing, and playback to air channels. One source of information is the output of a Broadcast Traffic System, which is used to view the specific elements intended for broadcast. A separate source of information is the output of an Automation System, which details which elements are actually being played to air. Typically, the output of the Broadcast Traffic System is printed to paper (the Broadcast Logs) and given to authorized users.

However, many problems can occur in a Broadcast Operations Center that operates in such a fashion. For example, it is often important to compare the traffic output of the Broadcast Traffic System with the automation output of the Automation System to make sure every element of the traffic output is aired correctly. In such an example, in order to ensure that every element airs correctly, a user has to check each element in the traffic output with each element in the automation output, which is a very manual effort and can take a considerable amount of time and effort. For another example, when changes are made to the Broadcast Traffic System after the Log is printed it requires a user to reprint numerous copies of the new traffic output and distribute those copies to authorized users and is again checked against the automation system to ensure changes have been correctly applied.

Another separate and manual function of a Broadcast Center is capturing, investigating and reporting broadcast channel/feed related information, problems and discrepancies for each broadcast day.

SUMMARY

The present disclosure is directed to an electronic broadcast log system, substantially as shown in and/or described in connection with at least one of the figures, as set forth more completely in the claims.

BRIEF DESCRIPTION OF THE DRAWINGS

FIG. 3 shows a flowchart illustrating a method for generating and utilizing an electronic broadcasting log, according to one implementation of the present disclosure.

DETAILED DESCRIPTION

Figure 1:
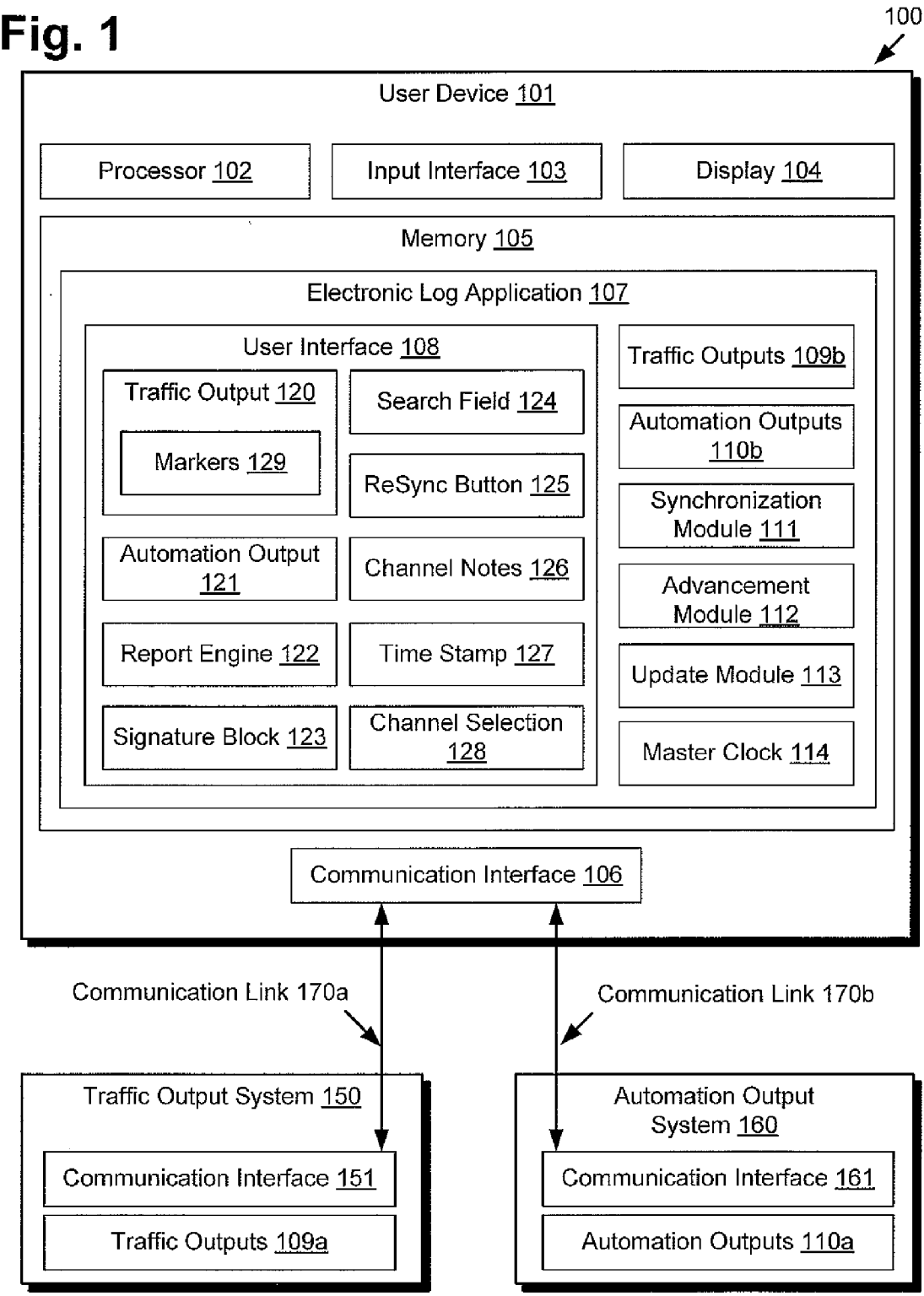
FIG. 1 presents a system for utilizing an electronic broadcasting log, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for utilizing an electronic broadcast log, according to one implementation of the present disclosure. System 100 of FIG. 1 includes user device 101, traffic output system 150, and automation output system 160. User device 101 includes processor 102, input interface 103, display 104, memory 105, and communication interface 106. Memory 105 includes electronic log application 107. Electronic log application 107 includes user interface 108, traffic outputs 109b, automation outputs 110, synchronization module 111, advancement module 112, update module 113, and master clock 114. User interface 108 includes traffic output 120, automation output 121, report engine 122, signature block 123, search field 124, ReSync button 125, channel notes 126, time stamp 127, and channel selection 128. Traffic output 120 includes markers 129. Traffic output system 150 includes traffic outputs 109a and communication interface 151. Automation output system 160 includes automation outputs 110a and communication interface 161. Also illustrated in FIG. 1, system 100 includes communication link 170a and communication link 170b.

User device 101 may include a personal computer, a mobile phone, a tablet, a video game console, or any other device capable of executing electronic log application 107. As shown in FIG. 1, user device 101 includes input interface 103 and display 104. Input interface 103 may comprise, for example, a keyboard, a mouse, a game controller, a touch-screen input, a thermal and/or electrical sensor, or any other device capable of accepting user input for use with user device 101. Display 104 may comprise a liquid crystal display (LCD) screen built into user device 101. In alternative implementations of the present disclosure, display 104 may be another type of display hardware, such as cathode-ray tubes (CRT) monitors. In yet other implementations, display 104 may also be touch sensitive and may serve as input interface 103. Moreover, input interface 103 and display 104 may be externally attached to user device 101 through physical or wireless connection.

As illustrated in FIG. 1, user device 101 further includes processor 102 and memory 105. Processor 102 may be configured to access memory 105 to store received input or to execute commands, processes, or programs stored in memory 105, such as electronic log application 107. Processor 102 may correspond to a processing device, such as a microprocessor or similar hardware processing device, or a plurality of hardware devices. However, in other implementations processor 102 refers to a general processor capable of performing the functions required of user device 101. Memory 105 is a sufficient memory capable of storing commands, processes, and programs for execution by processor 102. Memory 105 may be instituted as ROM, RAM, flash memory, or any sufficient memory capable of storing a set of commands. In other implementations, memory 105 may correspond to a plurality memory types or modules.

It should be noted that each of traffic output system 150 and automation output system 160 may be similar to user device 101. For example, each output of traffic system 150 and automation output system 160 may include, but are not limited to, a personal computer, a mobile phone, a tablet, a video game console, or any other device capable of communicating with another device. Furthermore, traffic output system 150 and automation output system 160 may each include a processor, display, input interface, and memory. For example, a processor (not shown) of traffic output system 150 may be configured to access a memory (not shown) of traffic output system 150 to store received input or to execute commands, processes, or programs stored in the memory. In such an example, the memory of traffic output system 150 may be storing traffic outputs 109a. For another example, a processor (not shown) of automation output system 160 may be configured to access a memory (not shown) of automation output system 160 to store received input or to execute commands, processes, or programs stored in the memory. In such an example, the memory of automation output system 160 may be storing automation outputs 110*a*.

It should further be noted that the implementation of FIG. 1 illustrates traffic output system 150 and automation output system 160 as being separate from user device 101, however, the present disclosure is not limited to the implementation of FIG. 1. For example, in one implementation, user device 101, traffic output system 150, and automation output system 160 may be combined into a single system. For another example, in other implementations, user device 101 may be combined into a single system with either traffic output system 150 or automation output system 160, or traffic output system 150 may be combined into a single system with automation output system 160.

Also illustrated in FIG. 1, user device 101 includes communication interface 106. Processor 102 of user device 101 is configured to control communication interface 106 to communicate with other electronic devices. For example, as illustrated in FIG. 1, user device 101 may utilize communication interface 106 to communicate with communication interface 151 of traffic output system 150 and communication interface 161 of automation output system 160 through communication link 170*a* and communication link 170*b*, respectively. Communication interface 106, communication interface 151, and communication interface 161 can utilize, as examples, one or more of Wireless Fidelity (Wi-Fi), Worldwide Interoperability for Microwave Access (WiMax), ZigBee, Bluetooth, Algorithm Division Multiple Access (CDMA), Evolution-Data Optimized (EV-DO), Global System for Mobile Communications (GSM), Long Term Evolution (LTE), and other types of wired and wireless interfaces.

Also illustrated in FIG. 1, traffic output system 150 includes traffic outputs 109*a* and user device 101 includes traffic outputs 109*b*. Traffic outputs 109*a* corresponds to traffic outputs 109*b*, where traffic output system 150 transmitted traffic outputs 109*a* to user device 101 using communication link 170*a* and user device 101 stored traffic outputs 109*a* in electronic log application 107 in memory 105 as traffic outputs 109*b*. Traffic outputs 109*b* include television broadcast schedules for various broadcast channels. Each broadcast schedule for a broadcast channel includes a listing of elements that are scheduled to be aired for that broadcast channel. The elements for broadcast channels can include, but are not limited, television programs, television program segments, sports programs, news programs, advertisements, promotions, graphics, or any other type of program or program segment that can be aired using a broadcast channel. For example, a traffic output from traffic outputs 109*a*, such as traffic output 120, may specify that a first segment of a television show airs first, followed by three advertisements, followed by a second segment of the television show, followed by three more advertisements, and finally followed by a third segment of the television show.

Also illustrated in FIG. 1, automation output system 160 includes automation outputs 110*a* and user device 101 includes automation outputs 110*b*. Automation outputs 110*a* corresponds to automation outputs 110, where automation traffic system 160 transmitted automation outputs 110*a* to user device 101 using communication link 170*b* and user device 101 stored automation outputs 110*a* in electronic log application 107 in memory 105 as automation outputs 110*b*. Automation outputs 110*b* include transmission playlists for the various broadcast channels. Each transmission playlist for a broadcast channel includes a listing of the elements that actually did air, are currently being aired, and/or will be aired for that broadcast channel. As discussed above, the elements can include, but are not limited to, television programs, television program segments, sports programs, news programs, advertisements, promotions, graphics, or any other type of program of program segment that can be aired using a broadcast channel.

Also illustrated in FIG. 1, user device 101 includes electronic log application 107. Electronic log application 107 is utilized by user device 101 to both generate and operate an electronic broadcast log. As such, electronic log application 107 includes user interface 108, which corresponds to the electronic broadcast log, and synchronization module 111, advancement module 112, update module 113, and master clock 114, which are used by electronic log application 107 to operate and display user interface 108.

User interface 108 includes traffic output 120 and automation output 121. Traffic output 120 corresponds to one of traffic outputs 109*b*, and automation output 121 corresponds to one of automation outputs 110*b*. As such, traffic output 120 includes a broadcast schedule for a broadcast channel and automation output 121 includes a transmission playlist for the corresponding broadcast channel. As illustrated in FIG. 1, user interface 108 renders both traffic output 120 and automation output 121 on a single electronic interface. For example, in one implementation, traffic output 120 and automation output 121 are rendered right next to each other by user interface 108.

While rendering both traffic output 120 and automation output 121 by user interface 108, electronic log application 107 utilizes, as discussed above, each of synchronization module 111, advancement module 112, update module 113, and master clock 114 to operate user interface 108. Synchronization module 111 may be utilized by electronic log application 107 to synchronize traffic output 120 with automation output 121. In synchronizing traffic output 120 with automation output 121, automation output 121 drives the synchronization. For example, as automation output 121 is automatically being displayed and advanced by electronic log application 107 using user interface 108, synchronization module 111 automatically syncs traffic output 120 with automation output 121. In such an example, as will be discussed in more detail below, as elements of automation output 121 advance, traffic output 120 is advanced to reflect the advancement of automation output 121.

Advancement module 112 may be utilized by electronic log application 107 to advance traffic output 120 in real-time according to master clock 114 when automation output 121 stops, where master clock 114 includes a clock that synchronizes a time used by a Broadcast Operations Center to broadcast channels. For example, during live feeds or non-program time periods, automation output 121 will automatically advance to the next scheduled element and then stop advancing. During these time periods, advancement module 112 will continue to advance traffic output 120 in real-time according to master clock 114 even though automation output 121 has been stopped at the next scheduled element. Once automation output 121 begins to advance again, such as when there is a break in the live feed and the next scheduled program is broadcast, then traffic output 120 is once again driven by automation output 121 and advanced with automation output 121.

It should be noted that advancement module 112 will only advance traffic output 120 to the next scheduled element while automation output 121 is stopped. For example, if a live feed is airing and advancement module 112 is advancing traffic output 120 according to master clock 114, advancement module 112 will only advance traffic output 120 to the next scheduled element according to automation output 121. This way when the next scheduled element is broadcast and automation output 121 starts advancing, traffic output 120 is automatically synced with automation output 121 and will once again be driven by automation output 121.

Updates module 113 may be utilized by electronic log application 107 to update traffic output 120 being displayed by user interface 108 based on feedback from automation output 121. The feedback from automation output 121 can include comparing automation output 121 with traffic output 120 to determine which elements of traffic output 120 either did not air correctly, or which elements from traffic output 120 did not air at all. Update module 113 updates traffic output 120 with markers 129, where Markers 129 mark scheduled elements from traffic output 120 as having been aired correctly or as not having been aired correctly based on the feedback from automation output 121. As such, markers 129 may include, but are not limited to, color codes, checkmarks, notes, signs, signals, or any other type of markings that can be used by electronic log application 107 to illustrate if scheduled elements from traffic output 120 were aired correctly or not aired correctly. For example, update module 113 may highlight scheduled elements from traffic output 120 that aired correctly in green and highlight scheduled elements from traffic output 120 that did not air correctly in red. This way a user of electronic log application 107 can quickly and easily determine if all of the scheduled elements from traffic output 120 aired as scheduled.

For example, update module 113 may update traffic output 120 based on feedback from automation device 121, where the feedback includes comparing the elements of traffic output 120 with the elements of automation output 121. In such an example, elements listed in traffic output 120 may include four difference commercials that are supposed to air, commercials A, B, C, and D. Feedback from automation output 121 may show that commercials. A, B, C, and E actually did air. As such, updating module 113 would compare the elements of traffic output 120 with the elements of automation output 121 and determine that commercial D did not air correctly as commercial E aired instead. Therefore, update module 113 would update traffic output 120 to show that commercial A, B, and C aired correctly, however, update module 113 would update traffic output 120 to show that commercial D did not air correctly.

In one implementation, update module 113 automatically updates traffic output 120 in real-time. For example, each time automation output 121 advances to a new element, that new elements is compared with the corresponding scheduled element from traffic output 120 to check if the scheduled element aired correctly according to traffic output 120. In such an example, if the scheduled element from traffic output 120 did air correctly, then the scheduled element will be marked as aired correctly and if the scheduled element from traffic output 120 did not air correctly, then the scheduled element will be marked as not airing correctly. In other implementations, update module 120 may update traffic output 120 periodically, after a set number of elements have been aired, or each time a user chooses to update traffic output 120.

It should be noted that update module 113 further automatically updates traffic output 120 when changes are made to traffic output 120. For example, if traffic output system 150 makes any changes to traffic output 120, electronic log application 107 will utilize update module 113 to automatically update traffic output 120 being displayed by user interface 108 to reflect the changes that were made. As such, a user of electronic log application 107 will not need to constantly check to see if changes have been made to traffic output 120 as traffic output 120 being displayed by user interface 108 will always reflected the most updated version.

Also illustrated in FIG. 1, user interface 108 of electronic log application 107 includes report engine 122. Report engine 122 includes a location rendered by user interface 108 that can be utilized by of user interface 108 to input information regarding discrepancies that occur during normal operation of broadcast channels. Discrepancies may include problems with the airing of programs or discrepancies may include more general operational problems. For example, a user may utilize report engine 122 to report that a program did not air or why the program did not air correctly. In one implementation, discrepancy reports 122 may be synced with master clock 114 so that each discrepancy reported using report engine 122 is time stamped.

Also illustrated in FIG. 1, user interface 108 of electronic log application 107 includes signature block 123. Signature block 123 corresponds to a location rendered by user interface 108 that a user can utilize to certify that scheduled elements within traffic output 120 were correctly aired as reported by automation output 121. For example, a user of electronic log application 107 can utilize signature block 123 to verify that each scheduled element in traffic output 120 aired as scheduled by either watching the broadcast channel or looking at automation output 121. As such, signature block 123 may include, but is not limited to, a place to type a signature in, a place to write a signature in, a button to click, a thumbprint scanner on user device 101, or any other type of mechanism that can be used to electronically sign a verification report.

Also illustrated in FIG. 1, user interface 108 of electronic log application 107 includes search field 124 and ReSync button 125. Search field 124 corresponds to a location rendered by user interface 108 that a user can utilize to quickly search through traffic output 120 for specific elements. For example, a user of electronic log application 107 may use search field 124 to search to see if traffic output 120 includes a specific scheduled program. As such, search field 124 may include, but is not limited to, a place to type in a search query, a place to write in a search query, a dropdown menu that includes different search options to choose from, or any other type of searching method a user can use to search through traffic output 120.

It should be noted that when searching traffic output 120, synchronization module 111 still continues to sync traffic output 120 with automation output 121. As such, searching through traffic output 120 merely changes which elements of traffic output 120 are being rendered by user interface 108. However, searching through traffic output 120 does not affect the synchronization of traffic output 120 with automation output 121.

ReSync button 125 corresponds to a button rendered by user interface 108 that a user can utilize to return to a synced view of traffic output 120 and automation output 121. For example, as discussed above, user interface 108 renders traffic output 120 synced with automation output 121. If a user of user interface 108 then uses search field 124 to search for a specific element in traffic output 120, causing user interface 108 to no longer display a synced view of traffic output 120 and automation output 121, the user can utilize ReSync button 125 to once again have user interface 108 render traffic output 120 synced with automation output 121.

Also illustrated in FIG. 1, user interface 108 of electronic log application 107 includes channel notes 126. Channel notes 126 corresponds to a location rendered by user interface 108 that a user can utilize to either view notes that have already been submitted about a broadcast channel (via traffic output 109a) or to submit his or her own notes on the broadcast channel Information in channel notes 126 can include anything from notes on specific elements from traffic output 120 or automation output 121, such as how to operate scheduled elements in traffic output 120, to more general notes about operations in a Broadcast Operations Center.

Also illustrated in FIG. 1, user interface 108 of electronic log application 107 includes time stamp 127. Time stamp 127 corresponds to a button rendered by user interface 108 that a user can utilize to generate and store events, where each event generated by user interface 108 includes a time stamp of when the event was generated according to master clock 114. The user can then later return to the stored event and add notes about what occurred during the event. For example, a user may utilize time stamp 127 to generate an event that corresponds to a spot in a live program where a host advertised a specific product. In such an example, the event would include a time stamp of when the host advertised the product during the live program. The user can then go back later and add notes to the event, such as what product was advertised and how long the host advertised the product. Time stamp 127 thus gives users of electronic log application 107 an easy way to keep track of different events that occur during the airing of broadcast channels which is currently achieved by manually writing the time observed on the paper Broadcast Log.

Also illustrated in FIG. 1, user interface 108 of electronic log application 107 includes channel selection 128. Channel selection 128 corresponds to a location rendered by user interface 108 that a user can utilize to choose which broadcast channel user interface 108 is rendering. As discussed above, user device 108 stores traffic outputs 109b and automation outputs 110b for various broadcast channels. Channel selection 128 thus gives the user the ability to select which broadcast channel to render by user interface 108. For example, user interface 108 may be rendering a first traffic output and a first automation output, where the first traffic output and the first automation output correspond to a first broadcast channel. The user may then utilize channel selection 128 to select a second broadcast channel so that user interface 108 renders a second traffic output and a second automation output, where the second traffic output and the second automation output correspond to the second broadcast channel.

In the implementation of FIG. 1, electronic log application 107 utilizes user interface 108 to render traffic output 120 and automation output 121 of a broadcast channel. While rendering traffic output 120 and automation output 121, electronic log application 107 utilizes synchronization module to synchronize traffic output 120 based on automation output 121. Electronic log application 107 further utilizes update module 113 to update traffic output 120 with markers 129 based on feedback from automation output 121. Markers 129 mark each element of traffic output 120 as having been aired correctly or as not having been aired correctly. Update module 113 may update traffic output 120 based on a comparison between traffic output 120 and automation output 121.

It should be noted that the implementation of FIG. 1 may further include security features. For example, in one implementation, electronic log application 107 may include a security feature that does not allow users of electronic log application 107 to adjust or change traffic output 120 or automation output 121. In such an implementation, users of electronic log application 107 may only be able to view elements being displayed on user interface 108 of traffic output 120 and automation output 121.

It should further be noted more than one user may log into electronic log application 107 at a single time for the same channel, as will be discussed in more detail below. For example, in a first implementation, multiple users may be logged into electronic log system 107 viewing the same channel. In such an example, only one of the users logged into electronic log application 107 may be authorized to add, edit, or save data and information using electronic log application 107 for that channel. The user that is allowed to add, edit, or save data and information using electronic log application 107 may be the first user to log into electronic log application 107, or may be an authorized user of electronic log application 107. For another example, in other implementations where multiple users are logged into electronic log application 107 viewing a single channel, more than one user may be able to add, edit, or save data and information using electronic log application 107 for that channel.

For example, in the first implementation, multiple users may be logged into electronic log application 107 viewing a channel being broadcast in the East. In such an example, only one of the multiple users may be able to add, edit, or save data and information using electronic log application 107 for the channel being broadcast in the East. Furthermore, multiple users may be logged into electronic log application 107 viewing the same channel being broadcast in the West. Again, one of the multiple users may be able to add, edit, or save data and information using electronic log application 107 for the channel being broadcast in the West.

Figure 2:
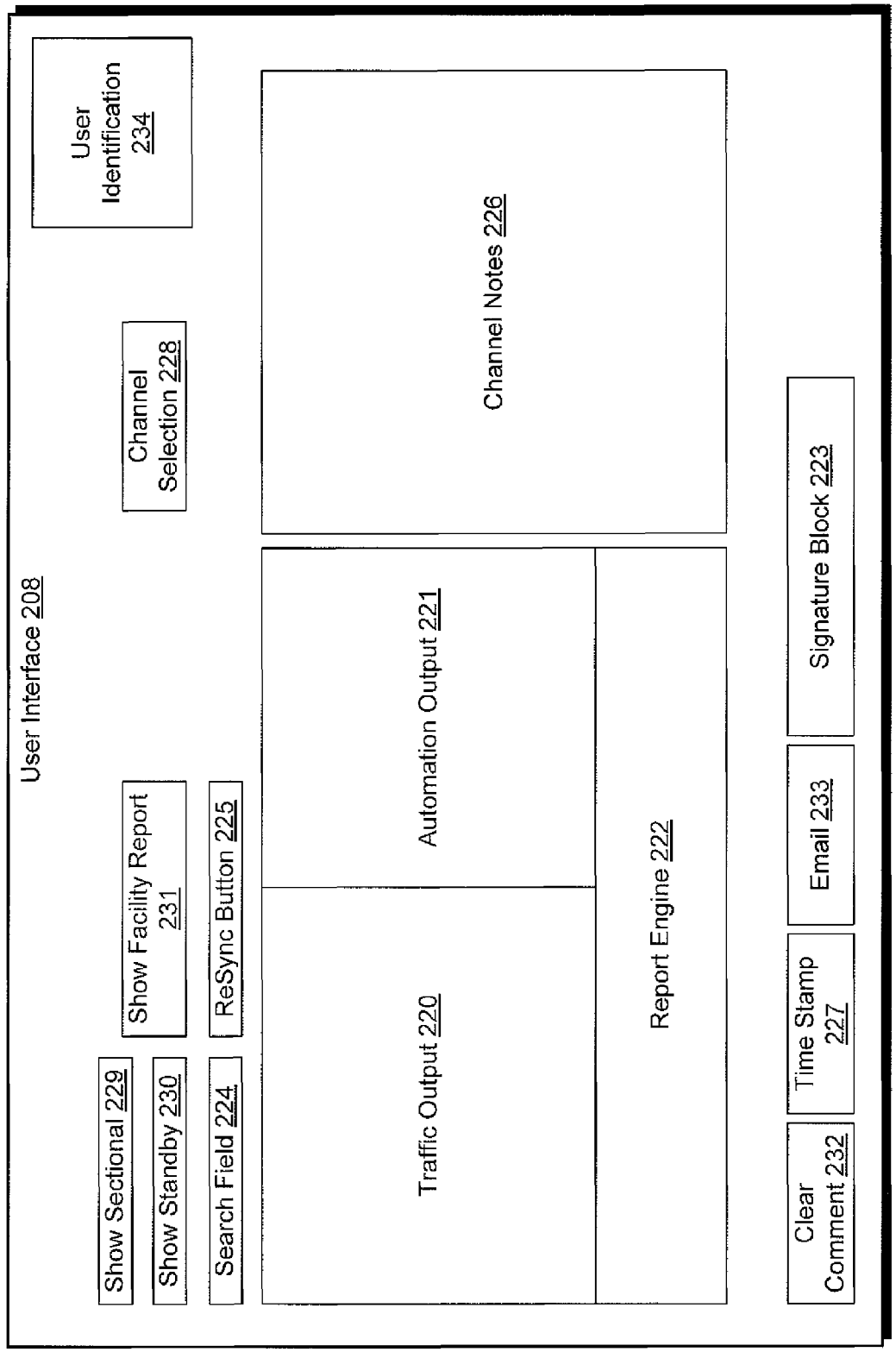
FIG. 2 presents an example of a user interface utilized for an electronic broadcasting log, according to one implementation of the present disclosure.

FIG. 2 presents an example of an user interface utilized for an electronic broadcast log, according to one implementation of the present disclosure. User interface 208 includes traffic output 220, automation output 221, report engine 222, signature block 223, search field 224, ReSync button 225, channel notes 226, time stamp 228, channel selection 229, show sectional 229, show standby 230, show facility report 231, clear comment 232, email 233, and user identification 234. With regards to FIG. 2, it should be noted that user interface 208, traffic output 220, automation output 221, report engine 222, signature block 223, search field 224, ReSync button 225, channel notes 226, time stamp 228 correspond respectively to traffic output 120, automation output 121, report engine 122, signature block 123, search field 124, ReSync button 125, channel notes 126, time stamp 127, and channel selection 128 of FIG. 1.

As illustrated in FIG. 2, user interface 208 renders traffic output 220 next to automation output 221. By rendering traffic output 220 next to automation output 221 on user interface 208, a user is able to easily see what elements from traffic output 220 are scheduled to air and what elements from automation output 221 either did, will, and/or are currently airing in near real-time. The user can also directly compare traffic output 220 with automation output 221 since traffic report 220 is synchronized with automation output 221. Finally, the user can determine any discrepancies between traffic output 220 and automation output 221 based on markers included in traffic output 220, such as markers 129 from FIG. 1.

As further illustrated in FIG. 2, user interface 208 includes additional elements not illustrated in FIG. 1, such as show sectional 229, show standby 230, show facility report 231, clear comment 232, email 233, and user identification 234. Show sectional 229 corresponds to a location rendered by user interface 208 that a user can utilize to switch between sectional channels of a broadcast channel, where sectional channels correspond to the same broadcast channel except each is directed towards and aired in a different region or location. As such, each sectional channel may include its own advertisements or other elements for the broadcast channel, and thus each section channel may include its own traffic output and automation output. For example, one sectional (or sub) channel for a main broadcast channel might include an advertisement for snow tires while a second sectional channel for the same broadcast channel might include an advertisement for summer tires, where each advertisement is scheduled to play in the same advertisement spot in the broadcast channels. A user can thus utilize show sectional 229 to select which sectional channel is being rendered by user interface 208 in a similar way as the user can use channel selection 228 to select which main broadcast channel is being rendered by user interface 208.

Show standby 230 corresponds to a location in user interface 208 that a user can utilize to access the standby channel for the main broadcast channel being rendered by user interface 208. For example, user interface 208 may be rendering the traffic output and automation output of a broadcast channel that is currently airing a live program. The broadcast channel may include a standby channel that can be switched to if there are any problems that arrive during the airing of the live programs. A user can then use show standby 230 to render the traffic output and automation output of the standby channel by user interface 208.

User identification 234 includes a location rendered by user interface 208 that displays which user is using user interface 208. For example, in one implementation, as discussed above with regards to FIG. 1, a user may use signature block 223 to certify that elements of traffic output 220 were aired as scheduled by signing his or her name electronically. In such an implementation, the user may merely type or write his or her name in user identification 234 so that user interface 208 knows who is using signature block 223. However, in another implementation, the electronic log application may include a user login, which requires the user to enter a username and password to access user interface 208. In such an example, after the user has logged in and accessed user interface 208, user identification 234 will automatically display the identity of that user. Furthermore, signature block 223 may also automatically sync with the identity of the logged in user so that the electronic log application knows who is certifying elements of traffic output 220.

Show facility report 231 corresponds to a button rendered by user interface 208 that a user can utilize to view facility reports. Clear comment 232 corresponds to a button rendered by user interface 208 that an authorized user can utilize to clear any comments that were made by the user in report engine 222. Finally, email 233 corresponds to a button rendered by user interface 208 that an authorized user can utilize to export reports via email. Furthermore, in one implementation, user identification 234 may sync with email 233 so that the personal email of the user of user interface 208 is used to transmit any emails.

It should be noted that the implementation of FIG. 2 shows user interface 208 including numerous features, such as traffic output 220, automation output 221, report engine 222, signature block 223, search field 224, ReSync button 225, channel notes 226, time stamp 228, channel selection 229, show sectional 229, show standby 230, show facility report 231, clear comment 232, email 233, and user identification 234, however, the present disclosure is not limited to the implementation of FIG. 2. In other implementations, a user interface may include more or less features than those illustrated in FIG. 2. Furthermore, still in other implementations, the features of a user interface may be configured using different arrangements. For example, the discrepancy report may or may not be displayed and/the location of the displays may be configured by an authorized user.

It should further be noted that each of traffic output 220, report engine 222, and channel notes 226 may include a scroll bar (not shown). A user of user interface 208 may utilize the scroll bars to search through each of traffic output 220, report engine 222, and channel notes 226. For example, and as discussed above, a user may search through the elements of traffic output 220. In such an example, the user may thus use the scroll bar for traffic output 220 to search for scheduled elements in traffic output 220.

FIG. 3 shows a flowchart illustrating a method for generating and utilizing an electronic broadcast log, according to one implementation of the present disclosure. The approach and technique indicated by flowchart 300 are sufficient to describe at least one implementation of the present disclosure, however, other implementations of the disclosure may utilize approaches and techniques different from those shown in flowchart 300. Furthermore, while flowchart 300 is described with respect to FIG. 1, the disclosed inventive concepts are not intended to be limited by specific features shown and described with respect to FIG. 1. Furthermore, with respect to the method illustrated in FIG. 3, it is noted that certain details and features have been left out of flowchart 300 in order not to obscure the discussion of inventive features in the present application.

Referring now to flowchart 300 of FIG. 3, flowchart 300 includes receiving a traffic output for a broadcast channel (310). For example, processor 102 of user device 101 can receive traffic output 120, where traffic output 120 corresponds to a broadcast schedule for a broadcast channel. Processor 102 can either receive traffic output 120 from traffic outputs 109*a* in traffic output system 150 using communication link 170*a*, or if user device 101 already has received traffic outputs 109*b* from traffic output system 150, processor 102 can retrieve traffic output 120 from traffic outputs 109*b*. As discussed above, traffic output 120 includes a listing of elements that are scheduled to be aired for the broadcast channel.

Flowchart 300 also includes receiving an automation output for the broadcast channel (320). For example, processor 102 of user device 101 can receive automation output 121, where automation output 121 corresponds to a transmission playlist for the broadcast channel. Processor 102 can either receive automation output 121 from automation outputs 110*a* in automation output system 160 using communication link 170*b*, or if user device 101 has already received automation outputs 110*b* from automation output system 160, processor 102 can retrieve automation output 121 from automation outputs 110*b*. As discussed above, automation output 121 includes a listing of elements that have already aired, are currently airing, and/or are scheduled to be aired for the broadcast channel.

Flowchart 300 also includes synchronizing the traffic output with the automation output (330). For example, processor 102 of user device 101 may utilize synchronization module 111 of electronic log application 107 to synchronize traffic output 120 with automation log 121. As discussed above, automation output 121 drives the synchronization of traffic output 120 with automation output 121. For example, as automation output 121 is automatically displayed and advanced by electronic log application 107 using user interface 108, synchronization module 111 automatically syncs the elements of traffic output 120 with the elements of automation output 121.

Flowchart 300 also includes displaying the traffic output synchronized with the automation output using a user interface on a display (340). For example, processor 102 of user device 101 may display traffic output 120 synchronized with automation output 121 using user interface 108 on display 104. As discussed above, in one implementation, traffic output 120 is displayed next to automation output 121 by user interface 108.

Flowchart 300 also includes advancing the traffic output and the automation output being displayed by the user interface in real-time (350). For example, processor 102 of user device 101 may advance traffic output 120 and automation output 121 being displayed by user interface 108 in real-time. As discussed above, automation output 121 is automatically advanced by electronic log application 107 on user interface 108 and traffic output 120 is synced with and automatically advances with automation output 121. Furthermore, when automation output 121 stops advancing, such as during a live feed or non-program time periods, advancement module 112 advances traffic output 120 according to master clock 114.

Concurrently, flowchart 300 also includes updating the traffic output being displayed by the user interface based on feedback from automation output (360). For example, processor 102 of user device 101 may utilize update module 113 of electronic log application 107 to update traffic output 120 being displayed by user interface 108 based on feedback from automation output 121. As discussed above, feedback from automation output 121 includes comparing automation output 121 with traffic output 120 to determine which elements of traffic output 120 either did not air correctly, or which elements from traffic output 120 did not air at all. Update module 113 updates traffic output with markers 129, where markers 129 mark scheduled elements from traffic output 120 as have been aired correctly or as not having been aired correctly based on the feedback from automation output 121.

It should be noted that flowchart 300 may be repeated when a user of user interface 108 selects a new channel using channel selection 128. For example, processor 102 of user device 101 may receive a second traffic output and a second automation output for a second broadcast channel in response to the user using channel selection 128 to select the second broadcast channel. Processor 102 may then utilize synchronization module 111 to synchronize the second traffic output with the second automation output and display the second traffic output synchronized with the second automation output using user interface 108 on display 104. Finally processor 102 may advance the second traffic output and the second automation output being displayed by user interface 108, and utilize update module 113 to update the second traffic output based on feedback from the second automation output.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system for displaying a traffic output synchronized with an automation output, the system comprising:
   a display;
   a memory storing a user interface; and
   a processor configured to:
      receive the traffic output;
      receive the automation output;
      synchronize the traffic output with the automation output; and
      display the traffic output synchronized with the automation output using the user interface on the display, wherein the user interface includes a location for reporting a discrepancy.

2. The system of claim 1, wherein the processor is further configured to advance each of the traffic output and the automation output being displayed by the user interface in real-time.

3. The system of claim 1, wherein the processor is further configured to update the traffic output being displayed by the user interface based on feedback from the automation output.

4. The system of claim 3, wherein updating the traffic output includes marking each event of the traffic output as being aired correctly or not being aired correctly.

5. A system for displaying a traffic output synchronized with an automation output, the system comprising:
   a display;
   a memory storing a user interface including a time stamp button; and
   a processor configured to:
      receive the traffic output;
      receive the automation output;
      synchronize the traffic output with the automation output;
      display the traffic output synchronized with the automation output using the user interface on the display
      generate an event that includes a time stamp in response to a user utilizing the time stamp button; and
      store the event in the memory.

6. The system of claim 5, wherein the processor is further configured to update the traffic output being displayed by the user interface based on feedback from the automation output.

7. A system for displaying a traffic output synchronized with an automation output, the system comprising:
   a display;
   a memory storing a user interface including a channel selection; and
   a processor configured to:
      receive the traffic output;
      receive the automation output;
      synchronize the traffic output with the automation output;
      display the traffic output synchronized with the automation output using the user interface on the display
      receive a new channel from a user using the channel selection;
      receive an another traffic output for the new channel;
      receive an another automation for the new channel;
      synchronize the another traffic output with the another automation output; and
      display the another traffic output synchronized with the another automation output using the user interface on the display.

8. An electronic log application stored in a non-transitory storage device for execution by a processor to display a traffic output synchronized with an automation output, the electronic log application comprising:
   a user interface for execution by the processor, the user interface configured to render the traffic output and the automation output, wherein the user interface is further configured to render a report engine;
   a synchronization module for execution by the processor, the synchronization module configured to synchronize the traffic output with the automation output on the user interface; and an update module for execution by the processor, the update module configured to update the traffic output based on feedback from the automation output.

9. The electronic log application of claim 8, wherein the traffic output and the automation output are advanced in real-time.

10. The electronic log application of claim 8, wherein updating the traffic output includes marking each event of the traffic output as being aired correctly or not being aired correctly.

11. An electronic log application stored in a non-transitory storage device for execution by a processor to display a traffic output synchronized with an automation output, the electronic log application comprising:
 a user interface for execution by the processor, the user interface configured to render the traffic output and the automation output, wherein the user interface is further configured to render a time stamp button, wherein an event is generated and stored in response to a user utilizing the time stamp button;
 a synchronization module for execution by the processor, the synchronization module configured to synchronize the traffic output with the automation output on the user interface; and
 an update module for execution by the processor, the update module configured to update the traffic output based on feedback from the automation output.

12. The electronic log application of claim 11, wherein the traffic output and the automation output are advanced in real-time.

13. An electronic log application stored in a non-transitory storage device for execution by a processor to display a traffic output synchronized with an automation output, the electronic log application comprising:
 a user interface for execution by the processor, the user interface configured to render the traffic output and the automation output, wherein the user interface further includes a channel selection button;
 a synchronization module for execution by the processor, the synchronization module configured to synchronize the traffic output with the automation output on the user interface; and
 an update module for execution by the processor, the update module configured to update the traffic output based on feedback from the automation output;
 wherein the user interface is further configured to render another traffic output synchronized with another automation output in response to a user utilizing the channel selection button to select a new channel, each of the another traffic output and the another automation output corresponding to the new channel.

14. A method for displaying a traffic output synchronized with an automation output, the method comprising:
 receiving the traffic output;
 receiving the automation output;
 synchronizing the traffic output with the automation output; and
 displaying the traffic output synchronized with the automation output using a user interface on a display, wherein the user interface includes a location for reporting a discrepancy.

15. The method of claim 14, wherein the method further comprises advancing each of the traffic output and the automation output being displayed by the user interface in real-time.

16. The method of claim 14, wherein the method further comprises updating the traffic output displayed by the user interface based on feedback from the automation output.

17. The method of claim 16, wherein updating the traffic output includes marking each event of the traffic output as being aired correctly or not being aired correctly.

18. A method for displaying a traffic output synchronized with an automation output, the method comprising:
 receiving the traffic output;
 receiving the automation output;
 synchronizing the traffic output with the automation output;
 displaying the traffic output synchronized with the automation output using a user interface on a display, wherein the user interface includes a time stamp button;
 generating an event that includes a time stamp in response to a user utilizing the time stamp button; and
 storing the event in a memory.

19. The method of claim 18, wherein the method further comprises updating the traffic output displayed by the user interface based on feedback from the automation output.

20. A method for displaying a traffic output synchronized with an automation output, the method comprising:
 receiving the traffic output;
 receiving the automation output;
 synchronizing the traffic output with the automation output;
 displaying the traffic output synchronized with the automation output using a user interface on a display, wherein the user interface includes a channel selection;
 receiving a new channel from a user using the channel selection;
 receiving an another traffic output for the new channel;
 receiving an another automation output for the new channel;
 synchronizing the another traffic output with the another automation output; and
 displaying the another traffic output synchronized with the another automation output using the user interface on the display.

* * * * *